United States Patent
Hamilton et al.

(10) Patent No.: US 7,124,951 B2
(45) Date of Patent: Oct. 24, 2006

(54) PROGRAMMABLE KEYPAD FOR SIZED OPTIMIZED DEVICE

(75) Inventors: Alistair Hamilton, Stony Brook, NY (US); Vanessa Rimando, Forest Hills, NY (US); Sudhir Bhatia, Brooklyn, NY (US); Thomas Conticello, St. James, NY (US); Shane MacGregor, Forest Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/903,760

(22) Filed: Jul. 30, 2004

(65) Prior Publication Data

US 2006/0022053 A1    Feb. 2, 2006

(51) Int. Cl.
    *G06K 7/10* (2006.01)
(52) U.S. Cl. .................................................. 235/472.01
(58) Field of Classification Search ........... 235/472.01, 235/462.45; 600/459; 358/473
    See application file for complete search history.

(56) References Cited

U.S. PATENT DOCUMENTS

| 6,149,062 | A | * | 11/2000 | Danielson et al. ..... 235/472.01 |
| 2004/0049388 | A1 | * | 3/2004 | Roth et al. ................... 704/251 |
| 2004/0138569 | A1 | * | 7/2004 | Grunwald et al. .......... 600/459 |

* cited by examiner

*Primary Examiner*—Thien M. Le
*Assistant Examiner*—Tae W. Kim
(74) *Attorney, Agent, or Firm*—Amin & Turocy, LLP (57) ABSTRACT

Systems and methods are provided that facilitate configuration of a keypad by end users of the portable host device, via employing a mapping component that can map individual keys of the keypad to characters and/or functions predefined by a user (e.g., defined for the host unit via a proprietary application/software). The reconfigurable keypad of the present invention can provide for a one touch access to special characters and/or performance of predetermined functions designated by the user, and thus facilitates performances of customized functions that can be unique to the end users.

17 Claims, 8 Drawing Sheets

PROGRAMMABLE KEYPAD FOR SIZED OPTIMIZED DEVICE

TECHNICAL FIELD

The present invention relates to systems and methods of providing an ergonomic keypad for a portable device, and more particularly to a keypad having keys that are configurable by an end user for accommodation of specific character symbols and/or user predefined functions.

BACKGROUND OF THE INVENTION

Increasing advances in computer technology (e.g., microprocessor speed, memory capacity, data transfer bandwidth, software functionality . . . ) have generally contributed to increased computer application in various industries. Today, portable hand held terminals users produce and manage large amounts of data or information, as compared to their respective work load in prior years. As such, portable hand held terminals are employed in many different industries, and are typically assembled by enclosing internal electrical components; such as keypads, a central processing unit (CPU) board, display, and internal wiring, within a housing made of plastic or another structural material.

Generally, a desirable characteristic of such terminals is that they can readily function, while a respective user performs other more demanding tasks. For example, a user may find it necessary to operate a data terminal with one hand, while leaving the other hand free. In particular, the user may find it desirable to lift or otherwise shift small items of inventory with one hand, while simultaneously inputting data or scanning them with the portable scanner held in the other hand.

Moreover, when employing the keypad for data input, the user typically should be able to manipulate keys on the keypad with ease and accuracy. Otherwise, the ensuing incompatibility can cause the hand, finger and wrist movements of the user operator to be somewhat strained, slowed, and even sometimes misdirected, resulting in not only unwanted and undesired physical stress on the operator, but also in undesired fatigue with resulting entry errors. The results of such repetitive stress and errors while manipulating the keypad on a portable terminal can cause unwanted loss in time for correcting the errors, as well as a loss in productivity through stress related injuries suffered by the keyboard operator. Such injuries may be severe enough to render the individual unemployable. For example, repetitive stroking of an incompatible keypad can typically stress the wrists, elbows and shoulders of an operator. As stated earlier, when continued over long periods of time, this can lead to repetitive stress injuries, such as carpal tunnel syndrome, which is a painful and oftentimes a crippling ailment affecting the tendons and nerves in the person's wrist area. Moreover, carpal tunnel syndrome is only one of several musculoskeletal injuries, frequently being identified variously as cumulative trauma disorder, repetitive strain injury, as well as repetitive motion disorder.

At the same time there is a continuing desire to reduce size of portable units. Such reduction in size can reduce the space available to the keypad and the associated individual key members. This can further hinder rapid and accurate data manipulation on a keypad interface. In particular, the user/operator should be able to enter information rapidly and accurately, and typically should not be required to undergo extensive and time consuming training in order to use the keypad arrangement for rapid data entry.

Therefore, there is a need to overcome the aforementioned deficiencies associated with conventional devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for an ergonomic keypad that can be customized according to a user's need, by employing a mapping component that can map individual operation for keys of the keypad, to correspond to functions and/or character display desired by a user (e.g., user functions predefined via a proprietary application/software). Such customized characters/functions can be inputted by a user into a memory component of the portable device hosting the keypad, and accessed (e.g., via an associated processor) when so is required. For example a dedicated key on the keypad provides a user access to a keypad mode, wherein a map of the existing programmed characters/functions being linked to various keys appear on a touch screen interface. The user can then employ such touch screen interface to reconfigure functions of individual keys of the keypad to desired character and/or customized applications. The reconfigurable keypad of the present invention can provide for a one touch access to special characters and/or performance of predetermined functions designated by the user, and thus facilitates performances of customized functions that can be unique to the end users.

In a related aspect of the present invention, a function of a key can be context sensitive and depend upon a mode that the portable device is assigned. For example, should the portable device be placed in a data collection mode (e.g., scanning) pressing a key can provide for a different character/function, as when the portable device is placed in a different mode, for example for sending and receiving messages, such as an e-mail mode.

According to another aspect of the present invention, the number of alpha numerical keys on the keypad can be reduced, by employing a modulator key that can switch characters assigned to a key between two or more alternatives. In particular, when a user holds a terminal with one hand, for example the left hand, the left thumb can control the use of the modulator key, so as typing occurs, a large surface area can be availed for fewer keys, providing for a more accurate key manipulation. For example, the number of alphabet characters appearing on the keypad can be reduced (e.g., halved) by employing such modulator key. In addition, the modulator key can be positioned on both sides of the terminal for ambidextrous use. In a related aspect of the present invention, in connection with identifying the required function desired by the user, for example in a particular context, the subject invention can employ various artificial intelligence based schemes for carrying out various aspects thereof.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not have been drawn to scale from one figure to another or within a given figure.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention provides for systems and methods that enable customizing an ergonomic keypad according to a user's need, by employing a mapping component, which can map individual operation for keys of the keypad, to correspond to functions and/or character display desired by a user. Accordingly, as used in this application, the terms "component" and "system" are intended to also refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. It is to be appreciated that filters, subfilters, filter managers, classifiers, models, order groups and other various items are components.

Figure 1:
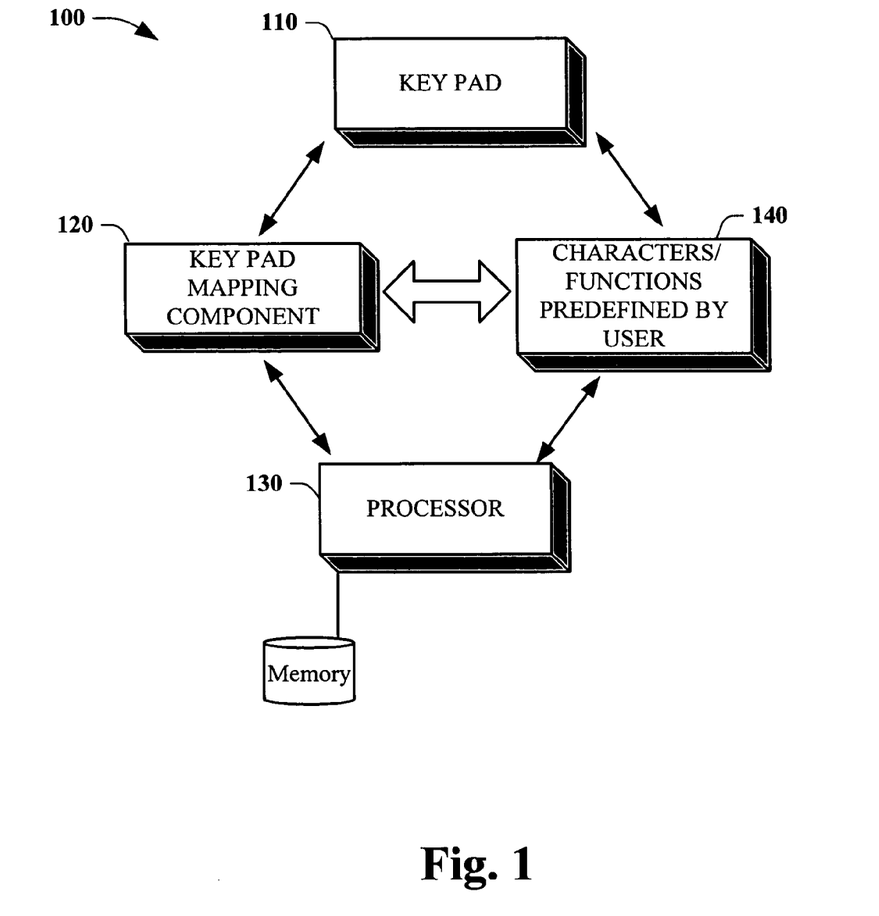
FIG. 1 illustrates an exemplary block diagram of selected components of a configurable keypad in accordance with an aspect of the present invention.

FIG. 1 illustrates an exemplary block diagram 100 of selected components employed as part of a hand held terminal with a configurable keypad in accordance with an aspect of the present invention. The hand held terminal(s) (described in detail infra) can include an operating system, an access log recorder, an access log recording file and an access or application process, which starts its operation after user's certification process. Such hand held terminal can further include data capture mechanism(s) (not shown) such as bar code scanning, image capture camera, radio frequency identification (RFID), bar code decoding imager, manual input feature and the like. The block diagram 100 can include a keypad mapping component 120 that can map a predetermined character (and/or function) 140 to an individual key (not shown) of the keypad 110. The mapping component 120 can interface with a user via a touch screen (not shown), and can be part of the keypad assembly, or part of the hand held terminal host device itself. Also, the processor 130 can be programmed to control and operate the various components within the arrangement 100 in order to carry out the various functions desired by the user to be mapped to the keypad 110. As such, various user defined characteristics that can be unique to operation of the end user can be incorporated into the keypad, via reconfiguration of individual keys.

For example, the portable device can be employed in Europe, wherein the individual key representing the character for the dollar currency symbol ($), can be reconfigured such that pressing its key will now represent the symbol for the Euro currency. Similarly, the portable device hosting such keypad can be customized to local languages that the portable device is employed therein. As such, need for custom designs/products can be mitigated as the ability to customize the product is inherent in the portable device's functionality.

In a related aspect of the present invention, such programming and/or reconfiguration of the keys associated with the keypad 110, can also correspond to predetermined functions specified by a user within a predefined context. For example, a predefined context can be a data collection mode (e.g., scanning). In such scanning mode, pressing a specific key, for example the pound key "#" can trigger a laser scan, or scanning at a predetermined scanning angle. At the same time, when the portable device is placed in a communication mode, pressing the pound key "#" can correspond to another function, for example sending an e-mail. Such context dependency of key functions can increase versatility when employing the portable device hosting a keypad according to the present invention.

In another aspect of the present invention, context dependency can also be a function of the environment that the portable device is being used therein. For example, the portable device can be employed in a local area network (LAN) or within a wide area network (WAN). Also, the connection between various components of the system (e.g. terminals, network computers, servers, and the like) can be wireless and/or hard wired. Accordingly, the environment wherein the portable device is operating can also affect functions associated with individual keys on the keypad, as predetermined by a user.

Figure 2:
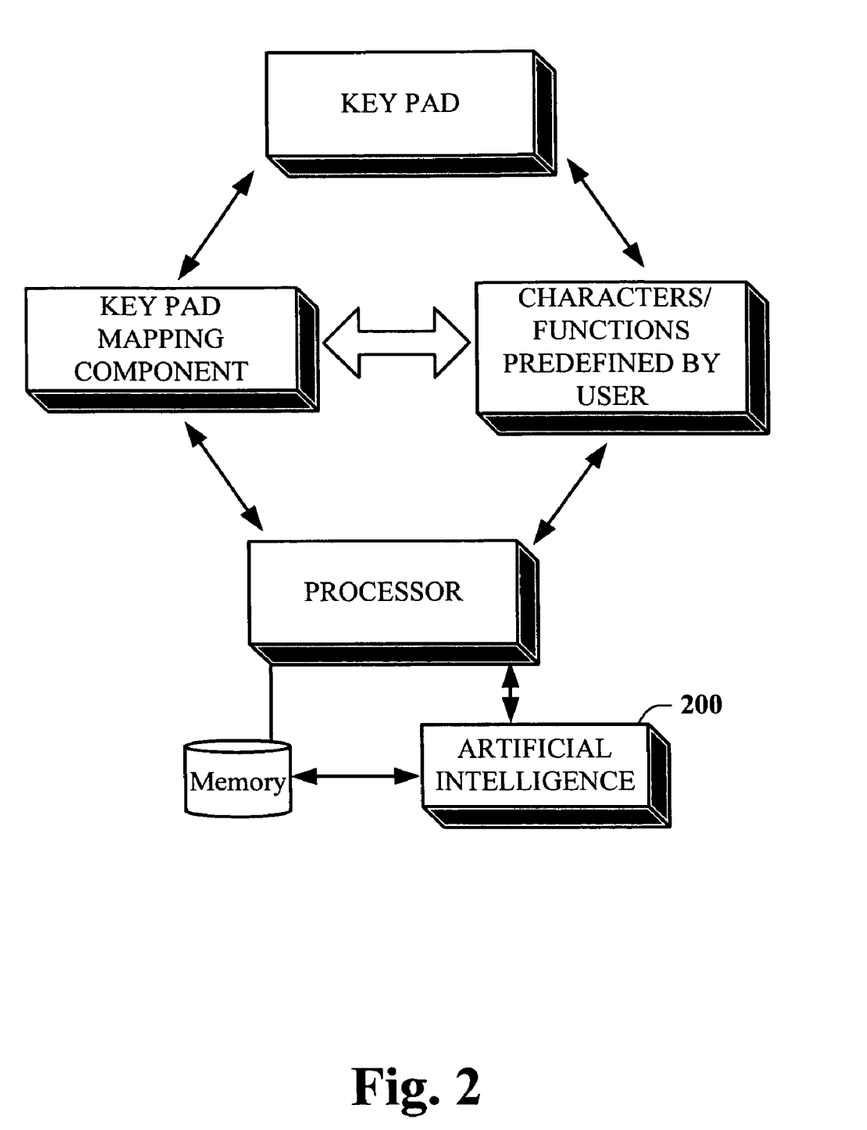
FIG. 2 illustrates a keypad block diagram that employs an artificial intelligence component in accordance with an aspect of the present invention.

Referring now to FIG. 2, a related aspect of the present invention is illustrated wherein, in connection with identifying a required function desired by the user, for example in a particular context, the subject invention can employ various artificial intelligence component(s) 200 based schemes for carrying out various aspects thereof. For example, a process for learning explicitly or implicitly when a specific character should be assigned to a particular key in a specific context, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other exemplary classification approaches that can also be employed include; Bayesian networks, decision trees, and probabilistic classification models providing different patterns of independence. Classification as used herein also is inclusive of statistical regression that is utilized to develop models of priority. Accordingly, the subject invention can employ classifiers that are explicitly trained (e.g., via a generic training data) as well as implicitly trained (e.g., via observing user behavior, receiving extrinsic information). Thus, the classifier can automatically return an answer to a question based on predetermined criteria. For example, with respect to SVM's, the SVM's can be configured via a learning or training phase within a classifier constructor and feature selection module. A classifier is a function that maps an input attribute vector, $x=(x1, x2, x3, x4, xn)$, to a confidence that the input belongs to a class— that is, $f(x)=$confidence (class).

In addition, the mapping component of the present invention can assign multiple functions to a particular key, wherein the key's function can be defined depending on the context of activity or action to be performed by the end user. Also, in a related aspect based on an inference of the AI component 200, the system can determine the upcoming context(s) of the activities of the end user, to assign the suitable functionality for each key. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. The keypad assembly can then switch to the suitable mode, to perform the function desired by the end user.

In a related aspect of the present invention, a mapping of each key member to a particular function and/or character can be performed via scanning an identification bar code by the scanner of the portable unit hosting the keypad of the present invention. Accordingly, keys on the keypad of the host unit can be set according to a predefined configuration, and to correspond to various functions/characters simply by scanning a predetermined bar code, which identifies particular functions/character for the mapping component.

Figure 3A:
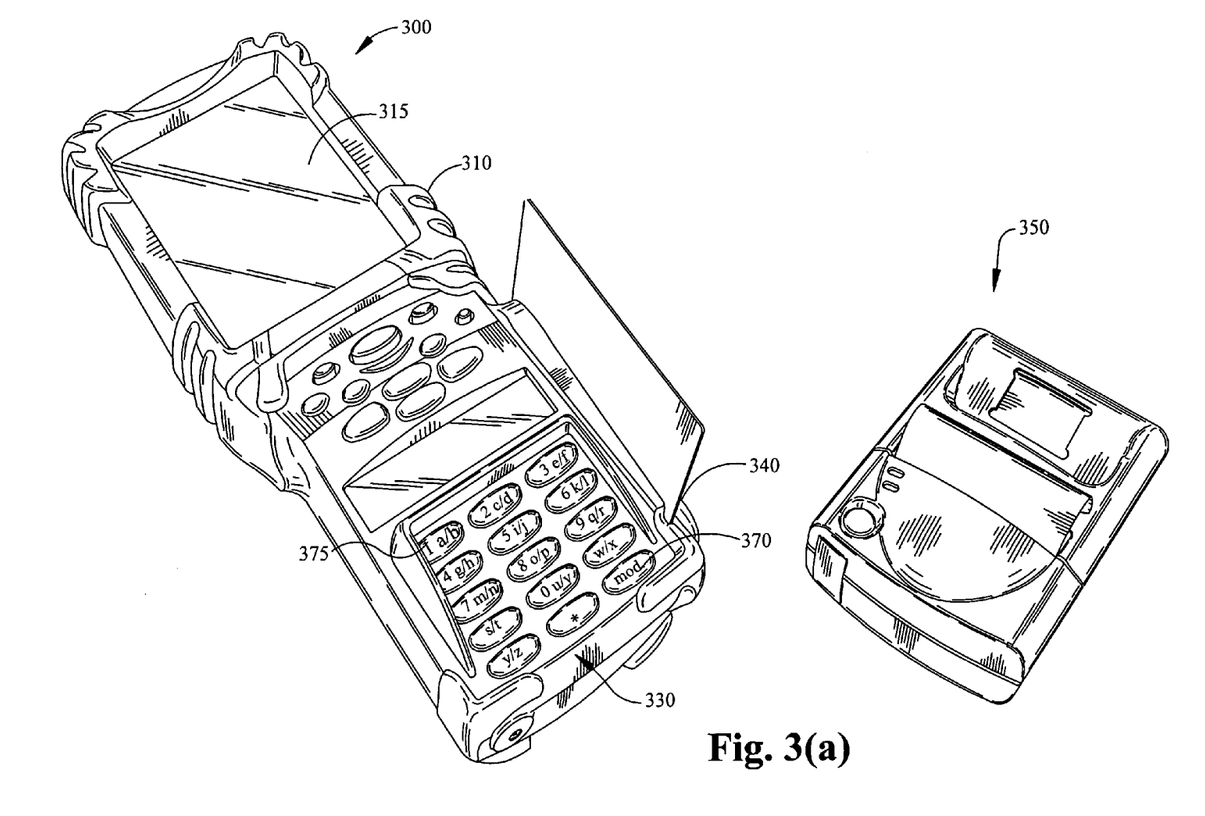
FIGS. 3(a) thru 3(c) illustrate exemplary handheld terminals and/or keypads in accordance with various exemplary aspects of the present invention.

FIG. 3(*a*) illustrates an example of a handheld terminal 300 in accordance with an aspect of the present invention. The handheld terminal 300 includes a housing 310 which can be constructed from a high strength plastic, metal, or any other suitable material. The handheld terminal 300 includes a display 315. The handheld terminal 300 further includes user input keypad 330 for allowing a user to input information and/or operational commands. The user input keypad 330 can include a modulator key 370 that when actuated can switch between characters assigned to an individual key. For example, if after pressing the modulator key 370, the key 375 is pressed the character "B" can appear. Alternatively, if key 375 is pressed without having pressed modulator key 370 immediately prior thereto, then the character "A" can appear. In a related aspect, to create the character "B", the modulator key 370 can be held in a pressed position, while at the same time key 375 is pressed. As such, the number of alpha numerical keys on the keypad 330 can be reduced, by employing the modulator key 370 that can switch characters assigned to a key between two or more alternatives. In particular, when a user holds the portable terminal 300 with one hand, for example the right hand, the right thumb can control the use of the modulator key, so that while typing occurs a large surface area can be availed for fewer keys, providing for a more accurate key manipulation. In addition, the modulator key 370 can be positioned on both sides of the portable terminal 300 for ambidextrous use. Various repeat key functions can also be employed.

The portable terminal 300 can also include a display 315 that functions to display data or other information relating to ordinary operation of the handheld terminal 300 and/or mobile companion. For example, software operating on the handheld terminal 300 and/or mobile companion may provide for the display of various functions requested by the user to be mapped by a mapping component (not shown) to desired keys on the keypad 330. Additionally, the display 315 may display a variety of functions that are executable by the handheld terminal 300 and/or one or more mobile companion(s) 350. The display 315 can provide for a touch screen interface for customization of specific graphics and/or language selection, to be mapped to individual keys on the keypad 330. Such touch screen interface can employ capacitive, resistive touch, infrared, surface acoustic wave, or grounded acoustic wave technology.

The handheld terminal 300 can also include a magnetic strip reader 340 or other data capture mechanism (not shown). The magnetic strip reader 340 can receive magnetic tags associated with specific functions that a user requires to be uploaded in to the memory of the portable unit, and that can correspond a specific function/character to a particular key on the keypad 330.

The handheld terminal 300 can also include a window (not shown) in which a bar code reader/bar coding imager is able to read a bar code label, or the like, presented to the handheld terminal 300. The handheld terminal 300 can include a LED (not shown) that is illuminated to reflect whether the bar code has been properly or improperly read. Alternatively, or additionally, a sound may be emitted from a speaker (not shown) to alert the user that the bar code has been successfully imaged and decoded. The handheld terminal 300 also includes an antenna (not shown) for wireless communication with an RF access point; and an IR transceiver (not shown) for communication with an IR access point.

The keypad 330 can include a top cover and a bottom cover that can be over molded around a common boundary. In one aspect of the present invention, the top cover and the bottom cover can sandwich a plurality of associated keypad components (e.g., flex members, electro luminous panel, a silicone membrane with a plurality of keys thereupon printed circuit boards, LEDs, and the like). The common boundary can be formed by a surface area and/or line perimeter common to the top cover and the bottom cover, (e.g. a contact surface between top and bottom cover, a surface encapsulating the keypad components, edges of the stacked components and the like.) Typically, materials employed for fabricating the keypad's 330 top cover and bottom cover can include various types of polycarbonates, thermoset plastics, thermoformed plastic, and typically material that are capable of over molding to provide a suitable bondage between the top cover and the bottom cover. Such suitable bondage can for example be capable of supplying a sealed keypad assembly that mitigates presence of external contaminants in the device. Moreover, the top cover can be fabricated with a transparent quality to provide for visual notification by illuminating a certain color or brightness on the keypad surface, when for example the modulator key 370 has been actuated.

Figure 3B:
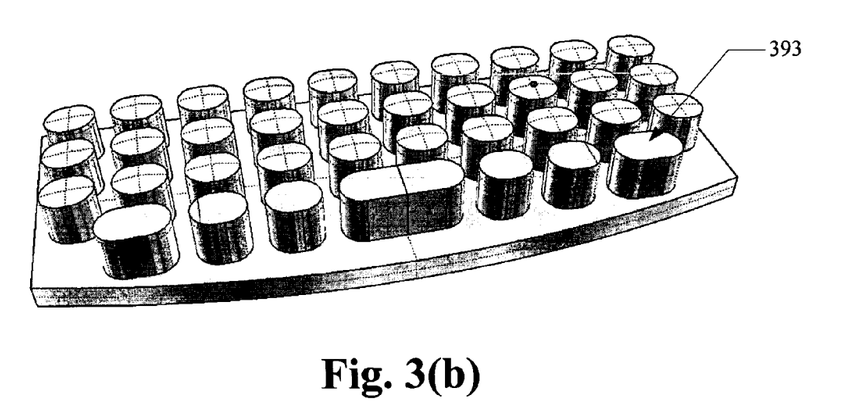
Figure 3C:
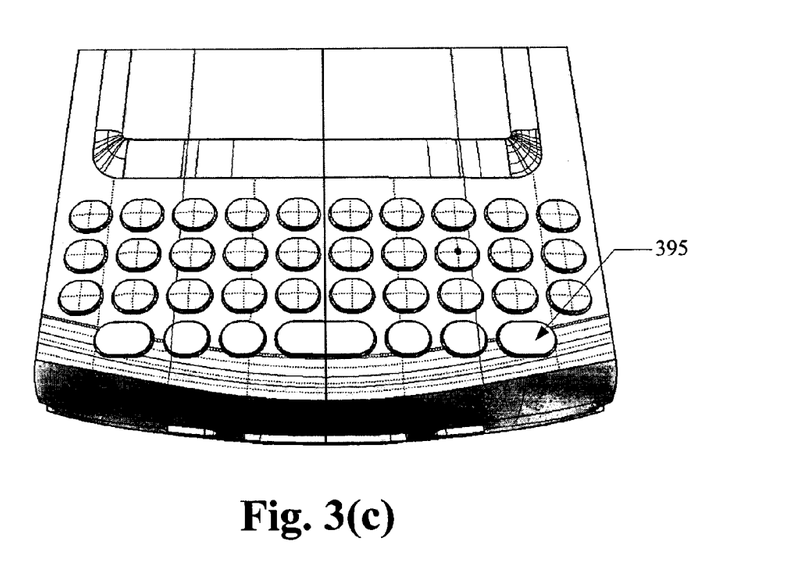

Moreover, if during operation the user initiates a mode that assigns predetermined functions to specific keys, or changes a normal operation mode for the unit by pressing a predetermined key, then a portion of the keypad can illuminate via LED(s), as to alert a user of the selected mode of operation. By observing the illuminating color or brightness on the keypad surface, a user can readily ascertain the mode selected for the unit and prepare accordingly. In particular, when actuation of the key changes a keypad's standard alphanumerical designations that keypads are conventionally programmed for operation therewith. Accordingly, a user may be dumbfounded if not alerted to such alterations in the function of the keypad. To mitigate such ambiguity, the keypad 330 of the present invention can provide a visual notification by illuminating a certain color or brightness on the keypad surface. Moreover, various audio heralds, alone or in combination with the visual alerts can be employed for alerting a user that a particular key has been actuated. Likewise, FIGS. 3(b) and 3(c) depict other exemplary illustrations of keypad(s) with modulator keys 393, 395 that can incorporate the above described features, in accordance with the present invention. It is to be appreciated that other configurations for the keypad and key designations for the modulator key are possible, and are within the realm of the present invention. Moreover, any suitable device (e.g., personal data assistant (PDA), miniature portable communications and/or scanning device, regular portable communications and/or scanning device, etc.) for carrying out the invention as described herein can be employed.

Figure 4:
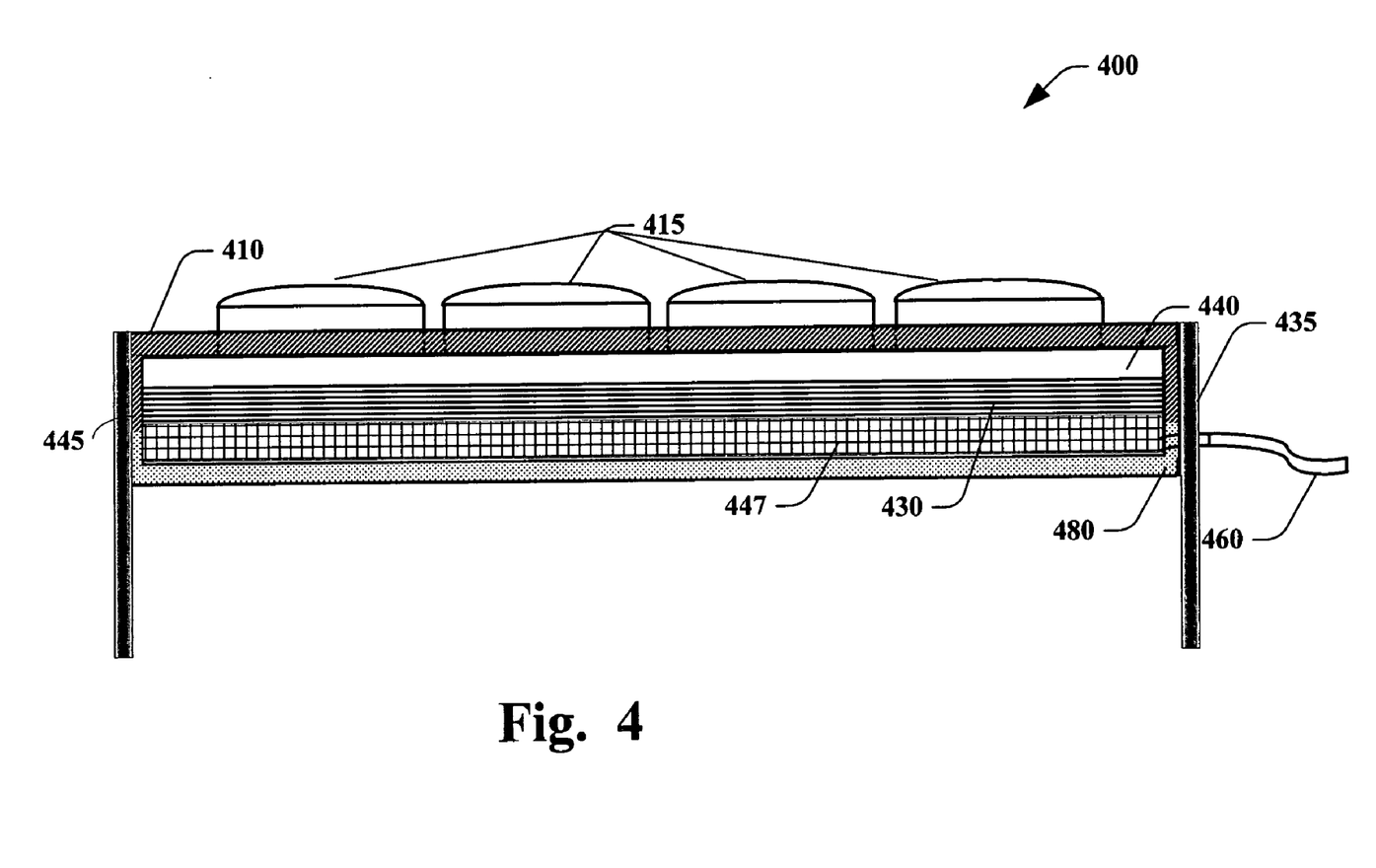
FIG. 4 illustrates an exemplary stack of keypad components employed for fabricating a reconfigurable keypad of the present invention.

FIG. 4 illustrates an exemplary stack of keypad components employed for fabricating a re-configurable stand alone keypad 400 of the present invention. Such stack can be packed or sandwiched between a top cover 410 and a bottom cover 480 that are over molded alongside a common boundary (445, 435) to create a sealed keypad assembly unit 400. The packed stack can include a silicone membrane 440 placed on top of an electro luminous panel 430, which in turn overlies a printed circuit board 447 with a flex member 460 hanging over sides thereof. The silicone membrane 440 can contain the individual keys 415 positioned thereupon, which protrude out of the top cover 410 via orifices therein. Each key 415 can have a curved upper surface for optimum thumb tangency, and the individual keys are sufficiently spaced apart so as not to interfere with actuating any one key. Entering variable data via the keypad to a host unit is similar to operating a calculator.

In addition dome shaped switch projections (not shown) are positioned at the bottom portion of each key, and are displaced between individual keys and the printed circuit board 447. When assembled, the contact projection of a corresponding dome switch at the bottom of each key aligns with a designated contact point (not shown) on the printed circuit board 447. When a key is pressed, its corresponding dome switch actually touches the designated contact point on the printed circuit board 447 to complete an electrical circuit, and generate an input signal. When the user releases a pressure on the key, the dome switch and key restore to their original positions. The dome switches are selected from a material having a predetermined degree of elasticity such that the dome switches can return to their original shape after the user withdraws from pressing on the keys. The electro luminous panel 430 can be a thin plastic component that can glow when a current is applied thereto, and is positioned beneath the silicone membrane 440.

As illustrated, the top cover 410 and bottom cover 480 can define a common perimeter extending around the keypad assembly, which can be subsequently over molded (445, 435) to create a sealed keypad assembly unit 400. The packed stack between the top cover 410 and the bottom cover 480 can include: a printed circuit board 447 with a flex member 460 that can be an extension thereof, an electro luminous panel 430, and a silicone membrane with a plurality of keys thereupon. The top cover 410 can include a plurality of orifices wherein the keys 415 poke there through. The printed circuit board 447 can be connected to an inner surface of the bottom plastic cover 480 via an adhesive, or can also be insert molded therein. The projecting flex member 460 can bend and attach to an outer surface (facing the host unit) of the bottom cover 480, to provide connection to the mapping component that can be positioned in the host unit.

It will be appreciated by one skilled in the art that a variety of different wire patterns and metal strips can be selected in order to achieve the desired connections with the host device. Also, conducting metal lines on such flex member 460 can be formed by printing, etching, or any other suitable method.

Figure 5:
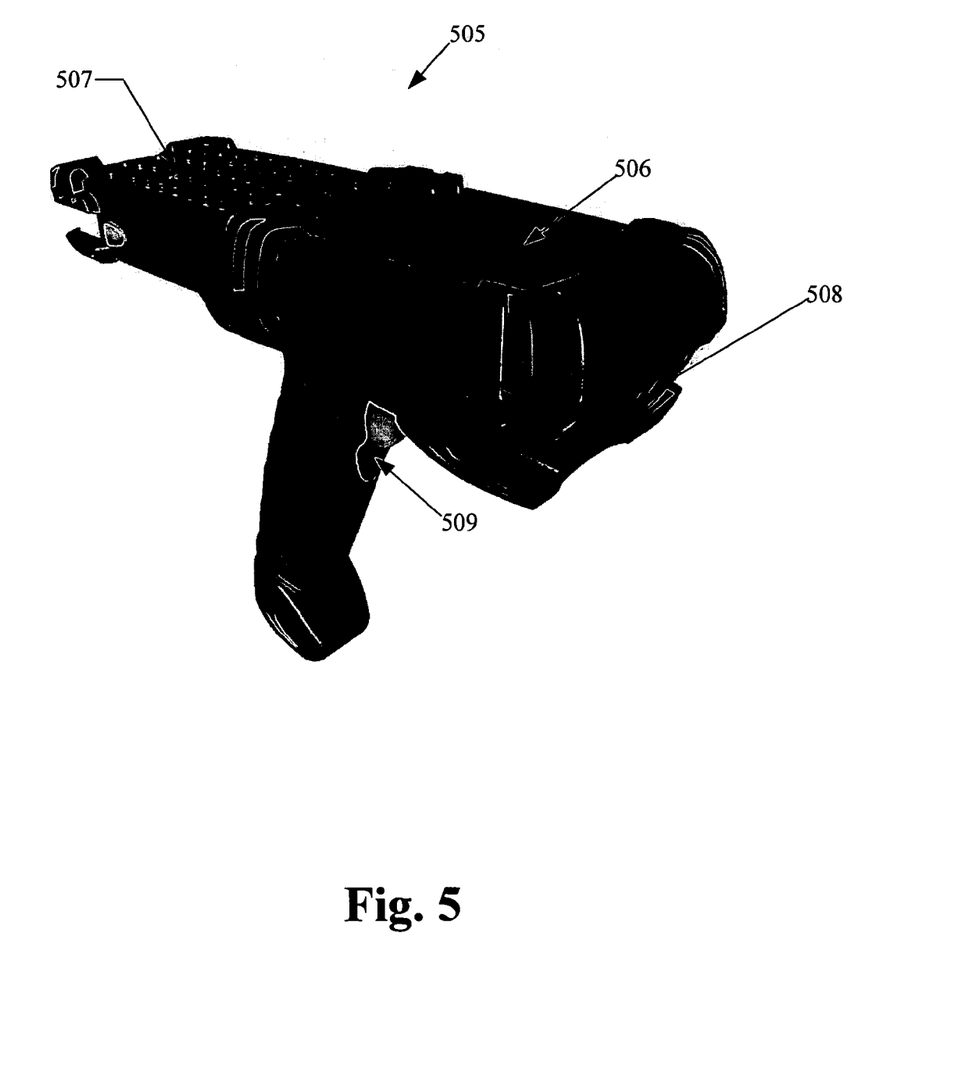
FIG. 5 illustrates an exemplary hand held scanner that can host a reconfigurable keypad of the present invention.

The reconfigurable keypad of the present invention can be employed in a variety of electrical or electronic devices that can require entry of a user's input via pressing alpha, alphanumerical designations or keys thereon. Examples of such devices can include, palm pilots, mobile phones, telephones, faxes, computers, mini computers, scanners, terminals, and the like. One particular device that can incorporate such keypad is illustrated in FIG. 5. Referring now to FIG. 5, an exemplary hand held scanner is illustrated that can host a reconfigurable keypad of the present invention. The host terminal 505 includes a display 506 for displaying information. The display 506 can be a touch screen and may employ capacitive, resistive touch, infrared, surface acoustic wave, or grounded acoustic wave technology. Furthermore, the display 506 can be a liquid crystal device, cathode ray tube (CRT), field emission device (FED, also called flat panel CRT) or any other display device suitable for creating graphic images and alphanumeric characters recognizable to the user. The host terminal 505 further includes an over molded keypad 507, which is placed as a stand alone unit to enter information concerning modes of operation of the mobile terminal and can be configured byte end user to provide for unique applications predetermined byte end user, via employing a mapping component, as described in detail supra.

As shown, the portable bar code scanner 505 is configured to be held with the palm of a user's hand, and various keys on its self contained keypad 507 can be engaged by thumb or fingers of the hand holding the housing. The user aims the window 508 at a desired indicia to be read and presses the trigger 509 that activates the reader unit. Display unit 506 can be employed to display information relating to a mode of operation of the electronic unit, or display check information relating to an item being read by an optical scanner (not shown) located in the electronic unit. The bar code scanner 505 can be employed in a wireless communication network for tracking inventory, storing data, etc. Typically, no cables can be required to connect the scanner apparatus to a computer device, thereby further reducing its weight and consequent fatigue, and eliminating the inefficiencies caused by entanglement with such cables. Moreover, its size allows easy access to difficult scanning locations. The scanner 505 provides rapid key entry and reading of displayed information, providing the operator with real time data so that decisions and actions can be quickly implemented. A user can input and/or process data via keypad, scanner element, etc. independent of the hand-held terminal 505 being connected to a communication network, for example a LAN or a WAN. When hand-held terminal 505 does not include a transceiver to provide for real time communications, the data can be stored in memory within the hand-held terminal 505. Accordingly, should the hand-held terminal 505 subsequently be connected to a network, stored data can be downloaded to a host computer (not shown).

Figure 6:
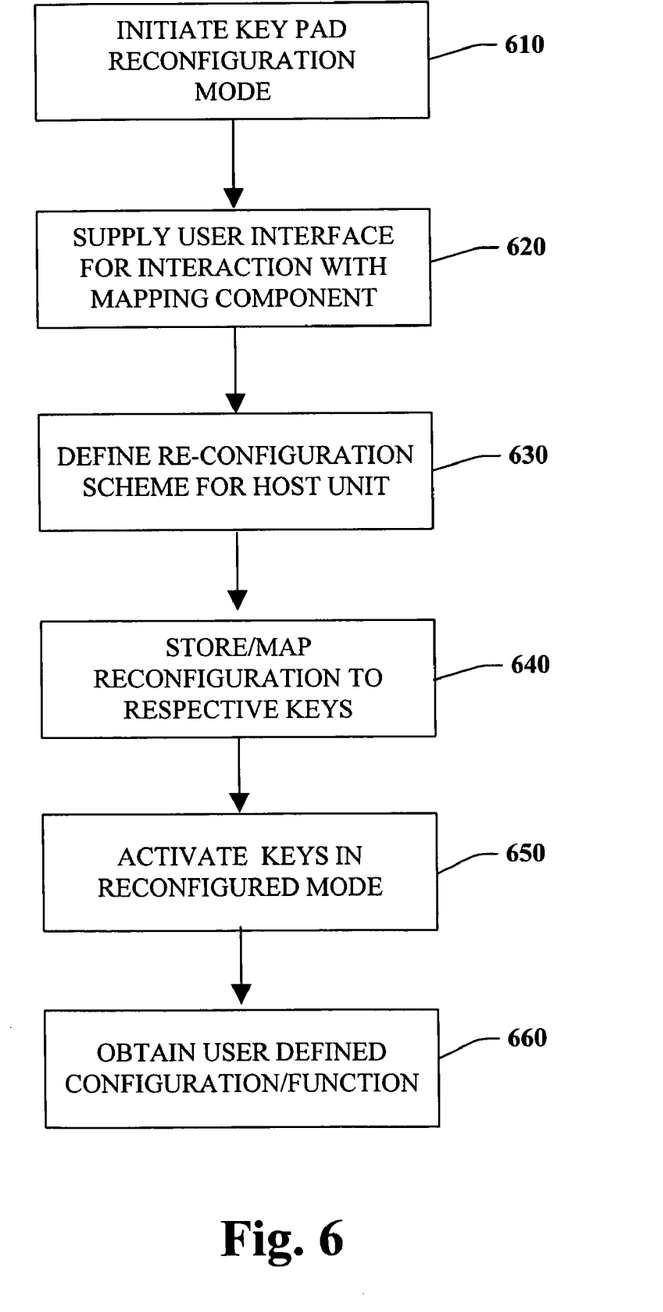
FIG. 6 illustrates an exemplary methodology according to one aspect of the present invention, for reconfiguring the keypad to meet the unique requirements of the end user.

FIG. 6 illustrates a methodology 600 according to one aspect of the present invention, for reconfiguring the keypad to meet the unique requirements of the end user, in accordance with an aspect of the present invention. Initially, and at 610 a re-configuration mode is initiated for the keypad. Such initiation can for example be in the form of actuating a particular key, such as the "Star" key on the keypad. Next, and at 620 the user is provided with an interface for interacting with the mapping component of the host unit. For example, the user can interface with the mapping component via a touch screen, as described in detail supra. The user can also upload various proprietary software, function designations and the like, to facilitate unique activities of the user. Such can define the reconfiguration scheme for the host unit at 630, to be employed by the mapping component for a mapping scheme to individual keys at 640. Thereafter, the host device employing the keypad of the present invention can be used to activate specific functions and/or keys at 650 to obtain user defined outcomes at 660.

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 7:
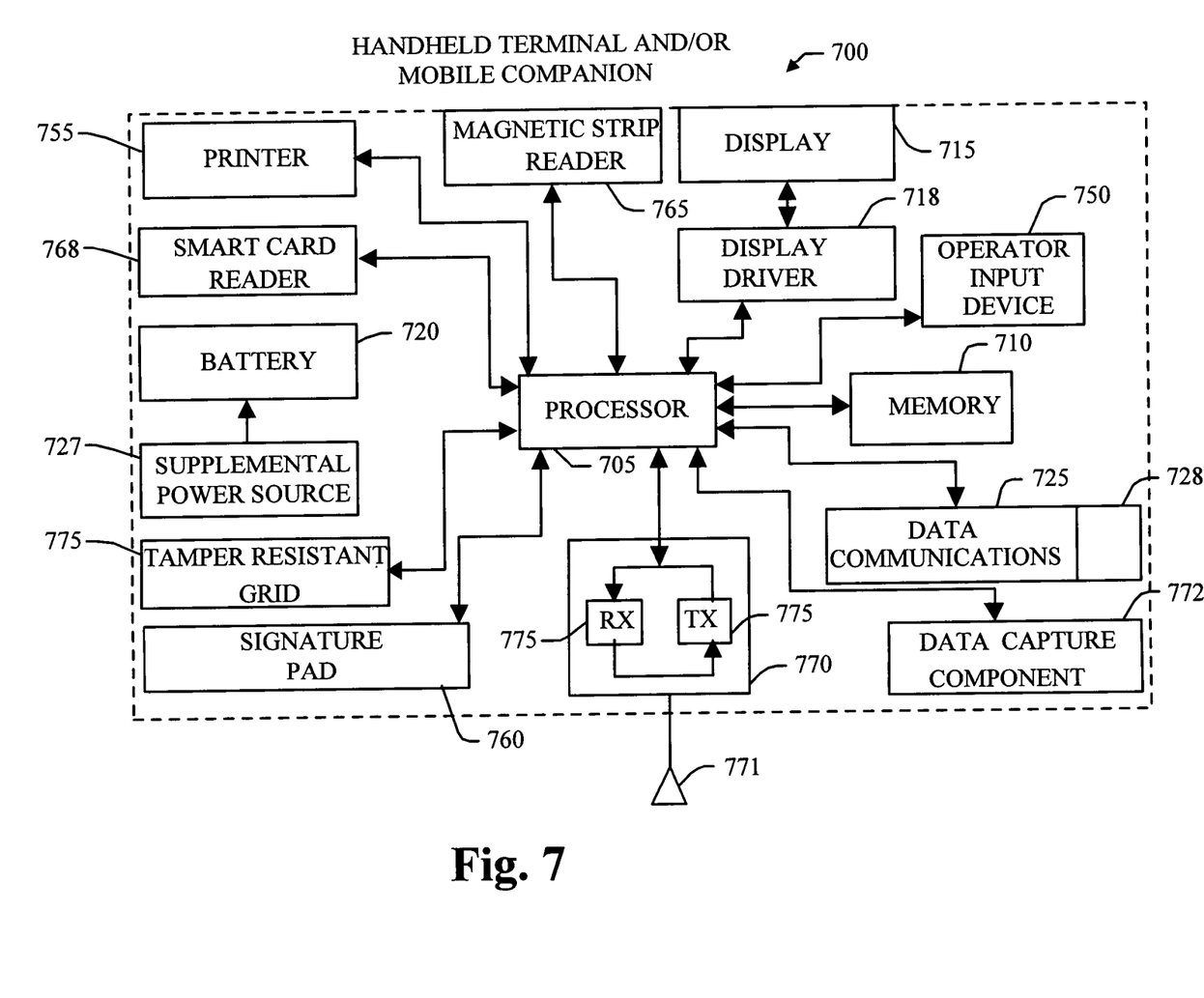
FIG. 7 illustrates a schematic exemplary representation of a portable terminal according to one aspect of the present invention

Turning now to FIG. 7, a schematic representation according to one aspect of the present invention is shown in which a processor 705 is responsible for controlling the general and/or reconfiguration operation of a handheld terminal and/or mobile companion 700. The processor 705 is programmed to control and operate the various components within the handheld terminal and/or mobile companion 700 in order to carry out the various functions described herein. The processor or CPU 705 can be any of a plurality of suitable processors. The manner in which the processor 705 can be programmed to carry out the functions relating to the present invention will be readily apparent to those having ordinary skill in the art based on the description provided herein.

A memory 710 tied to the processor 705 is also included in the handheld terminal and/or mobile companion 700 and serves to store program code executed by the processor 705 for carrying out operating functions of the handheld terminal and/or mobile companion 700 as described herein. The memory 710 also serves as a storage medium for temporarily storing information such as user defined functions and the like. The memory 710 is adapted to store a complete set of the information to be displayed. According to one aspect, the memory 710 has sufficient capacity to store multiple sets of information, and the processor 705 could include a program for alternating or cycling between various sets of display information.

A display 715 is coupled to the processor 705 via a display driver system 718. The display 715 can be a liquid crystal display (LCD) or the like. The display 715 functions to display data or other information relating to ordinary operation of the handheld terminal and/or mobile companion 700. For example, the display 715 may display suggested configurations for the keypad in a particular context, which is displayed to the operator and may be transmitted over a system backbone (not shown).

Additionally, the display 715 may display a variety of functions that control the execution of the handheld terminal and/or mobile companion 700. The display 715 is capable of displaying both alphanumeric and graphical characters. Power is provided to the processor 705 and other components forming the handheld terminal and/or mobile companion 700 by at least one battery 720. In the event that the battery(s) 720 fails or becomes disconnected from handheld terminal and/or mobile companion 700, a supplemental power source 727 can be employed to provide power to the processor 705. The handheld terminal and/or mobile companion 700 may enter a minimum current draw of sleep mode upon detection of a battery failure.

The handheld terminal and/or mobile companion 700 includes a communication subsystem 725 that includes a data communication port 728, which is employed to interface the processor 705 with the network via the host computer. The handheld terminal and/or mobile companion 700 also optionally includes an RF section 770 connected to the processor 705. The RF section 770 includes an RF receiver 775, which receives RF transmissions from the network for example via an antenna 771 and demodulates the signal to obtain digital information modulated therein. The RF section 770 also includes an RF transmitter 775 for transmitting information to a computer on the network, for example, in response to an operator input at an operator input device 750 (e.g., keypad, touch screen) or the completion of a transaction. Peripheral devices, such as a printer 755, signature pad 760, magnetic strip reader 765, and data capture device 772 can also be coupled to the handheld terminal and/or mobile companion 700 through the processor 705. The handheld. terminal and/or mobile companion 700 can also include a tamper resistant grid 775 to provide for secure payment transactions. If the handheld terminal and/or mobile companion 700 is employed as payment terminal, it can be loaded with a special operating system. Moreover, if the handheld terminal and/or mobile companion 700 is employed as a general purpose terminal, it can be loaded with a general purpose operating system.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

What is claimed is:

1. A portable unit comprising:
  a keypad assembly;
  a screen that presents an end user with a map between a plurality of keys upon the keypad assembly and associated functionality;
  a mapping component communicatively coupled to the keypad assembly, the mapping component receives input from the user with respect to the map presented upon the screen and configures one or more keys based at least in part upon the received input; and
  a data collection component that scans a bar code which sets a configuration of the keypad assembly to predefined functions desired by the user based on information from the bar code.

2. The portable unit of claim 1, further comprising a touch screen that interfaces with the end user and reconfigures functions of individual keys on the keypad assembly.

3. The portable unit of claim 1, a key of the keypad assembly performs a plurality of functions, each function based on a mode of the portable unit.

4. The portable unit of claim 1, further comprising an artificial intelligence component.

5. The portable unit of claim 1, the keypad assembly with comprises a modulator key that switches characters assigned to a key between two or more alternatives.

6. A keypad assembly comprising:
  a mapping component that assigns at least one of a function and character, predefined by a user based on information from a bar code, to a key on the keypad assembly, the assignment corresponds to a map between keys and associated functionality displayed upon a screen; and
  a modulator key that switches characters assigned to a key between two or more alternatives.

7. The keypad assembly of claim 6, further comprising:
  a mapping component in communication with a plurality of keys, the mapping component assigns at least one function and character, predefined by a user, to each of the plurality of keys.

8. The keypad assembly of claim 7, further comprising:
  a printed circuit board positioned beneath a membrane that comprises the plurality of keys;
  a top cover placed over the membrane; and
  a bottom cover placed under the printed circuit board, the top cover and the bottom cover define a common boundary and encapsulates the printed circuit board and membrane.

9. A method for keypad customization of a host unit comprising:
  displaying a mapping between keys and functionality on a graphical user interface;
  utilizing the host unit to scan a bar code which reconfigures the keys based on information from the bar code;
  receiving a reconfiguration scheme from a mapping component of the host unit by way of the graphical user interface, the mapping component operatively connected to keys of a keypad assembly of the host unit; and
  mapping the reconfiguration scheme to the keys.

10. The method of claim 9, further comprising employing an artificial intelligence component that assigns a key to a function based on use of the host unit in a specific context.

11. The method of claim 9, the receiving act further comprises receiving input from the user via a touch screen.

12. The method of claim 9, further comprising illuminating a surface of the keypad assembly based on a mode of the host unit.

13. The method of claim 9, further comprising uploading user proprietary software into the host unit.

14. The method of claim 9, further comprising storing user defined functions in a memory of the host unit.

15. The method of claim 9, further comprising illuminating the keypad assembly to alert the user of a selected mode of operation for the host unit.

16. The method of claim 9, the mapping act further comprises employing inferences of an artificial intelligence component.

17. A portable unit comprising:
  means for displaying a map of keys and associated function(s);
  inputting means for inputting data; and
  means for configuring the inputting means to configure keys with respect to the map through information acquired by scanning a bar code to correspond to an end user's predefined function(s).

* * * * *